United States Patent
Almond et al.

(10) Patent No.: US 10,237,362 B2
(45) Date of Patent: *Mar. 19, 2019

(54) EFFICIENT COMMUNICATION WITHIN HYBRID CLOUD SYSTEM

(71) Applicant: VMWARE, INC., Palo Alto, CA (US)

(72) Inventors: Michael Almond, Boulder Creek, CA (US); Dongwei Feng, Mountain View, CA (US); Abhishek Soni, San Jose, CA (US); Jagjit Singh Sethi, Sunnyvale, CA (US); Balamurugan Kannan, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/909,926

(22) Filed: Mar. 1, 2018

(65) Prior Publication Data

US 2018/0191855 A1  Jul. 5, 2018

Related U.S. Application Data

(63) Continuation of application No. 14/874,948, filed on Oct. 5, 2015, now Pat. No. 9,917,912.

(51) Int. Cl.
*H04L 29/06* (2006.01)
*H04L 29/08* (2006.01)

(52) U.S. Cl.
CPC ............ *H04L 67/26* (2013.01); *H04L 63/08* (2013.01); *H04L 67/1002* (2013.01); *H04L 67/1008* (2013.01); *H04L 67/141* (2013.01)

(58) Field of Classification Search
CPC ...... H04L 67/10; H04L 63/10; H04L 65/1013
See application file for complete search history.

(56) References Cited

U.S. PATENT DOCUMENTS

2016/0241596 A1* 8/2016 Overby, Jr. ............. H04L 63/20

OTHER PUBLICATIONS

Oracle Cloud Messaging, https:https://cloud.oracle.com/messaging; retrieved Oct. 6, 2015; 5 pgs.
Push Technology—Wikipedia, the Free encyclopedia: http://en.wikipedia.org/wiki/Push_technology#Long_pollling; retrieved Oct. 6, 2015; 5 pgs.
Bidirectional-streams Over Synchronous HTTP (BOSH); http://xmpp.org/extensions/xep-0124.html; retrieved Oct. 6, 2015; 44 pgs.
RFC 6455—The Websocket Protocol Internet Engineering Task Force (IETF); https://toools.ietf.org/html/rfc6455; Dec. 2011; 71 pgs.
"RFC 6120—Extensible Messaging and Presence Protocol (XMPP): Core," http://www.rfc-editor.org/rfc/rfc6120.txt; Mar. 2011.
Sockjs-protocol-03.3.3.py—http://sockjs.github.io/sockjs-protocol/sockjs-protocol-0.3.3.html; retrieved Oct. 6, 2015; 18 pgs.

(Continued)

*Primary Examiner* — Izunna Okeke
(74) *Attorney, Agent, or Firm* — Loza & Loza, LLP

(57) ABSTRACT

Techniques for communicating between service nodes within a hybrid cloud computing system. These techniques include utilizing a messaging provider within an off-premise computing system to pass messages between off-premise servers holding a connection to an on-premise computer system and off-premise servers holding a connection to an end user computer system.

21 Claims, 8 Drawing Sheets

(56) References Cited

OTHER PUBLICATIONS

Using nginx as HTTP load balancer; http://nginx.org/en/docs/http/load_balancing.html; retrieved Oct. 6, 2015; 5 pgs.
25.WebSocket Support; http://docs.spring.io/spring/docs/current/spring-frameworkreference/html/websocket.html; retrieved Oct. 6, 2015; 28 pgs.
OAuth 2.0—OAuth; http://oauth.net/2/; retrieved Oct. 6, 2015; 4 pgs.
Informatica Cloud Architecture, https://en.wikipedia.org/wiki/Informatica; retrieved Oct. 6, 2015; 4 pgs.

* cited by examiner

EFFICIENT COMMUNICATION WITHIN HYBRID CLOUD SYSTEM

CROSS-REFERENCE TO RELATED APPLICATIONS

This application claims priority to U.S. application Ser. No. 14/874,948, filed Oct. 5, 2015 (issued as U.S. Pat. No. 9,917,912), which is incorporated by reference herein in its entirety.

BACKGROUND

A hybrid cloud computing system includes computing devices both in an "off-premise" location (also referred to as cloud computer systems) and in an "on-premise" location (referred to as on-premise computer systems). The off-premise location (or cloud location) generally includes computer systems managed or controlled by a provider of "cloud" computing services and the on-premise location includes computer systems that function in one or more locations managed or controlled by a single entity that may subscribe to and utilize the cloud computing services. On-premise and off-premise computer systems may cooperate to provide services. In one example, hybrid cloud computing systems handle requests incoming from "external" computer systems (such as computer systems controlled by an end user or administrator), where at least part of the request is to be processed by an on-premise computer system.

For security, on-premise computer systems may be configured to reject incoming network connections and may only communicate with off-premise computer systems via outgoing connections. Thus, external computer systems typically send traffic to the off-premise servers, which transmit associated traffic to the on-premise servers for processing. Though several techniques exist for allowing communication from off-premise to on-premise computer systems despite the "no incoming connection" limitation, this type of communication is not straightforward.

Communication is further complicated due to the presence of load balancers within the hybrid cloud computing system that operate to redirect traffic to specific off-premise computer systems based on processing load (e.g., to prevent any particular system from being over- or under-burdened). Specifically, load balancers do not typically inspect incoming traffic deeply. Thus, load balancers may be unaware that traffic incoming from any particular external computer is destined for a particular on-premise computer. For this reason, load balancers may select an off-premise computer system to receive traffic from an external computer system, where the selected off-premise computer is different than the off-premise computer that has an open connection to the destination on-premise computer system. This further complicates the handling of traffic between external computer systems and on-premise computer systems.

SUMMARY

Embodiments of the present disclosure provide a method for communicating using a hybrid cloud computing system that includes at least one on-premise computer system and at least one off-premise computer system. The method includes selecting, to receive a request, a first off-premise computer system of the hybrid cloud computing system, based on load balancing parameters managed by a load balancer. The method also includes transmitting the request from the load balancer to the selected off-premise computer system. The method further includes identifying an on-premise computer system of the hybrid cloud computing system to process the request. The method also includes transmitting a message constructed based on the request to a request queue associated with the on-premise computer system. The method further includes pushing the message to a second off-premise computer system of the hybrid cloud computing system that has an open connection to the on-premise computer system. The method also includes transmitting the message to the on-premise computer system. The on-premise computer system is configured to not accept incoming connections. The first off-premise computer system and the second off-premise computer system are either the same or different off-premise computer systems.

Further embodiments include a non-transitory computer-readable storage medium storing instructions that cause a computer to carry out the above method and a system.

DETAILED DESCRIPTION

Figure 1:
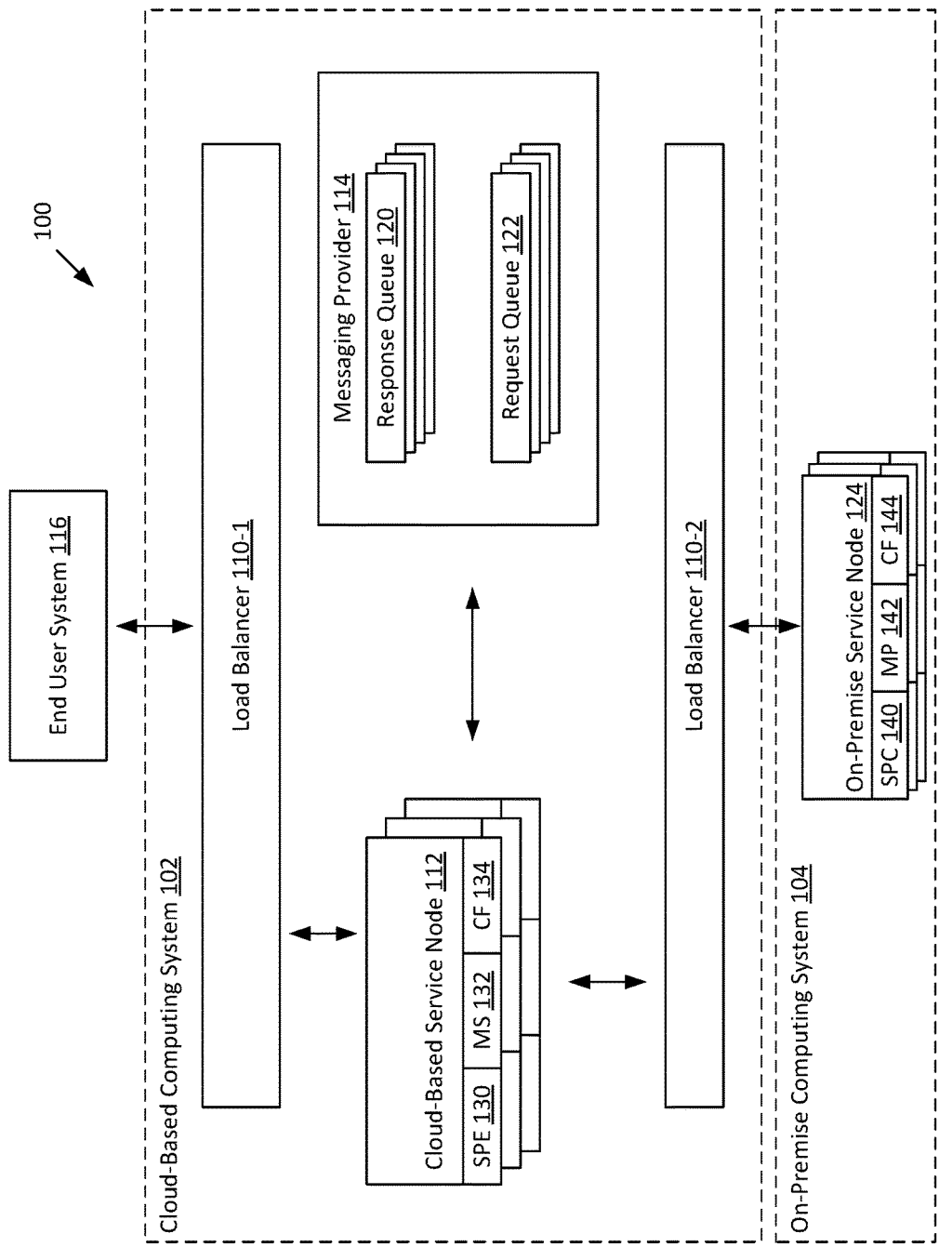
FIG. 1 is a block diagram of a hybrid cloud computing system implementing techniques for communicating between on-premise and off-premise computing systems, according to an example.

Aspects of the present disclosure include techniques for communicating between service nodes within a hybrid cloud computing system. A hybrid cloud computing system, described in further detail below, includes computing devices both in an "on-premise" location and in an "off-premise" location. The off-premise location generally includes computer systems managed or controlled by a provider of "cloud" computing services and the on-premise location includes computer systems that function in one or more locations managed or controlled by a single entity that may subscribe to and utilize the cloud computing services. Computer systems and computing services provided at the off-premise location may be considered to be part of the "cloud." A cloud service provider may control many off-premise computer systems and provide computing-as-a-service to different entities that manage different sets of on-premise computing systems. Such entities may utilize the cloud-based computing-as-a-service to extend the capabilities of their on-premise computer systems and/or to provide services that are complementary to services provided by on-premise computer systems. The term "off-premise" and "cloud" may be used interchangeably to denote computer systems and computing resources that generally meet the above criteria.

Typically, off-premise computer systems and on-premise computer systems need to communicate. In one example, a workspace service is provided by on-premise computer systems and off-premise computer systems working in concert. For example, with VMware® Horizon Workspace™, which allows for management of user workspace environments (such as what applications and data are accessible by users), on-premise components may act at the direction of off-premise components. Specifically, off-premise components may push user workspace configurations to on-premise components, which then act on those configurations by providing users with an appropriate workspace configuration.

For security, on-premise computer systems may be configured to not accept incoming network connections (e.g., public-facing over-the-Internet connections) and may only communicate via outgoing connections. In one example, on-premise computer systems may send hypertext transfer protocol ("HTTP") requests and receive HTTP responses but may not respond to HTTP requests. Despite these limitations, there may be instances in which off-premise computer systems need to send data to on-premise computer systems when a connection between the on-premise and off-premise computer systems is not open. Since, as stated above, on-premise computer systems do not accept incoming connections, several techniques may be used to communicate information from off-premise computer systems to on-premise computer systems.

One technique for communicating information from an off-premise computer system to an on-premise computer system is long polling. Long polling is a scheme in which the on-premise system periodically sends an HTTP request to an off-premise server asking whether the off-premise server has any messages for the on-premise server. If any messages exist, the off-premise server sends an HTTP response with such messages. If no such messages exist, the off-premise server holds the HTTP connection open for a period of time and, if a new message for the on-premise server is obtained, sends that message to the on-premise server. After receiving the response, the on-premise server immediately sends a new HTTP request requesting messages. Note that the HTTP connection may be closed by intermediate proxies or the like. This technique also results in many unnecessary HTTP requests to the off-premise server and introduces undesirable latency from when the message is created in the off-premise server to when the on-premise server next checks for available messages. This technique requires tradeoffs between acceptable request load and acceptable latency.

Another technique for communicating information from an off-premise computer system to an on-premise computer system is HTTP streaming. HTTP streaming is a technique in which the on-premise computer system opens a connection to an off-premise computer system which maintains the connection open and sends ("streams") messages to the on-premise computer system as those messages become available. As with long polling, the HTTP connection may be closed by intermediate proxies or the like.

Another technique for communicating information from an off-premise computer system to an on-premise computer system is with WebSockets. WebSockets is a protocol having a standard defined at least partially in RFC (Request for Comments) 6455 (available at https://tools.ietf.org/html/rfc6455). The WebSockets protocol allows for a full-duplex TCP (Transmission Control Protocol) connection to be established via HTTP. Specifically, the on-premise computer system sends a special HTTP request to the off-premise computer system, which responds by establishing a secure TCP connection.

Although the above techniques can be used to communicate between servers in a hybrid cloud system in which on-premise servers do not accept incoming connections, communication is made more complicated with the presence of load balancers, and with the ability of public end user systems (i.e., computing systems that access functionality of the hybrid cloud system and that are considered "outside" of both the on-premise and off-premise components of the hybrid cloud system—also referred to as "external" computer systems or "systems external to the hybrid cloud system") to be able to connect to the hybrid cloud system. Specifically, load balancers may direct communications from both end user systems and from on-premise servers to any particular off-premise server. Because the connection with an end user system may be made to an off-premise server that is different than the off-premise server that holds an open connection to an on-premise server, network traffic for workflows that include communication between the end user system and an on-premise server may need to be redirected. This redirection can, in many instances, lead to undesirable latency.

Techniques are thus provided herein for quick, efficient, secure, and reliable communication in hybrid cloud systems featuring load balancing and where on-premise computer systems may not accept incoming connections but open outgoing connections to transfer information between on- and off-premise computer systems. These techniques include utilizing a messaging provider within an off-premise computing system to pass messages between off-premise servers holding a connection to an on-premise computer system and off-premise servers holding a connection to an end user computer system.

FIG. 1 is a block diagram of a hybrid cloud computing system 100 implementing techniques for communicating between on-premise and off-premise computing systems, according to an example. As shown, hybrid cloud computing system 100 includes a cloud-based computing system 102, and an on-premise computing system 104. Cloud-based computing system 102 includes a first load balancer 110-1, cloud based service nodes 112, a messaging provider 114, and a second load balancer 110-2. Each of the load balancers 110, cloud based service nodes 112 and messaging provider 114 may be embodied as dedicated hardware (e.g., an application-specific integrated circuit configured to cause the element to perform the functionality described herein) or software executing on hardware (e.g., a separate computing system with processor, memory, and computer program instructions configured to cause the element to perform the functionality described herein) configured to perform the associated functionality described herein. On-premise computing system 104 includes one or more on-premise service nodes 124. End user system 116 communicates with cloud-based computing system 102 to request services or information. Requests from end user system 116 may need to be serviced by one or more on-premise service nodes 124, meaning that cloud-based service nodes sometimes relay messages from end user system 116 to an on-premise service node 124. End user system 116 generally includes a computing system with a processor and memory storing instructions that cause the processor to perform various actions, including requesting information and/or services from cloud-based computing system 102.

Each load balancer 110 may represent a different software process executing in the same or a different computer system. Load balancer 110-1 and load balancer 110-2 may also be the same entity—that is, the same software process executing on the same computer system. Load balancers 110 function to accept network traffic from outside cloud-based computing system 102 and direct the traffic to an appropriate cloud-based service node 112 as specified by various factors including factors related to load balancing. Load balancers 110 may be implemented in a wide variety of ways. Broadly speaking, in operation, a load balancer 110 accepts incoming transmission (e.g., HTTP requests). For each incoming transmission, load balancer 110 analyzes a set of factors such as how busy each cloud-based service node 112 is, any white-listing or black-listing rules, and other factors. Based on these factors, load balancer 110 selects a particular cloud-based service node 112 to which to send the transmission, and sends the transmission to the selected cloud-based service node 112. In general, load balancers 110 attempt to distribute incoming traffic among multiple cloud-based service nodes 112 in order to prevent any particular node 112 from being overloaded or underutilized. Note that load balancers 110 accept traffic from both on-premise computing system 104 and end user system 116, both of which may be connected to cloud-based computing system 102 via an open, public, world-wide computing network such as the Internet or via other types of networks.

Each cloud-based service node 112 represents a distinct computing environment in which one or more service-related processes execute. For example, a single cloud-based service node 112 may represent a single virtual machine executing a suite of software processes for providing various services. A single cloud-based service node 112 may alternatively or additionally represent a single physical computing system (e.g., with one or more processors and memory elements storing instructions that cause the one or more processors to perform various functionality) executing a suite of software processes for providing various services. Cloud-based service nodes 112 may communicate with each other via components of a physical network, components of a virtual network, or components of both.

Messaging provider 114 represents distinct software and/or hardware elements for facilitating communication between cloud-based service nodes 112 regarding traffic involving both end user system 116 and on-premise computing system 104. More specifically, messaging provider 114 maintains response queues 120 and request queues 122 that contain messages related to communication with end user system 116 and on-premise computing system 104. The operation of message provider 114 is described in more detail below.

On-premise computing system 104 represents a collection of computing resources maintained by an organization in one or more physical locations that provide a variety of services to computer systems outside of hybrid cloud computing system 100. Each on-premise service node 124 represents a distinct computing environment in which one or more service-related processes execute, similar to cloud-based service nodes 112. Thus, any particular on-premise service node 124 may represent a single virtual computer system or physical computing system (with, e.g., corresponding processor and memory) executing one or more processes for providing the above-described services. Note that although on-premise service nodes 124 and cloud-based service nodes 112 are typically at different physical locations, this need not be the case.

Cloud-based service nodes 112 include a socket protocol endpoint ("SPE") 130, a messaging service ("MS") 132, and a communication façade ("CF") 134. On-premise service node 124 includes a socket protocol client ("SPC") 140, a message processor ("MP") 142, and a communication façade ("CF") 144. Broadly, these elements, together with messaging provider 114, implement a hybrid cloud messaging protocol for enabling efficient communication involving end user system 116, cloud-based computing system 102, and on-premise computing system 104. These elements are described in further detail below.

Figure 2:
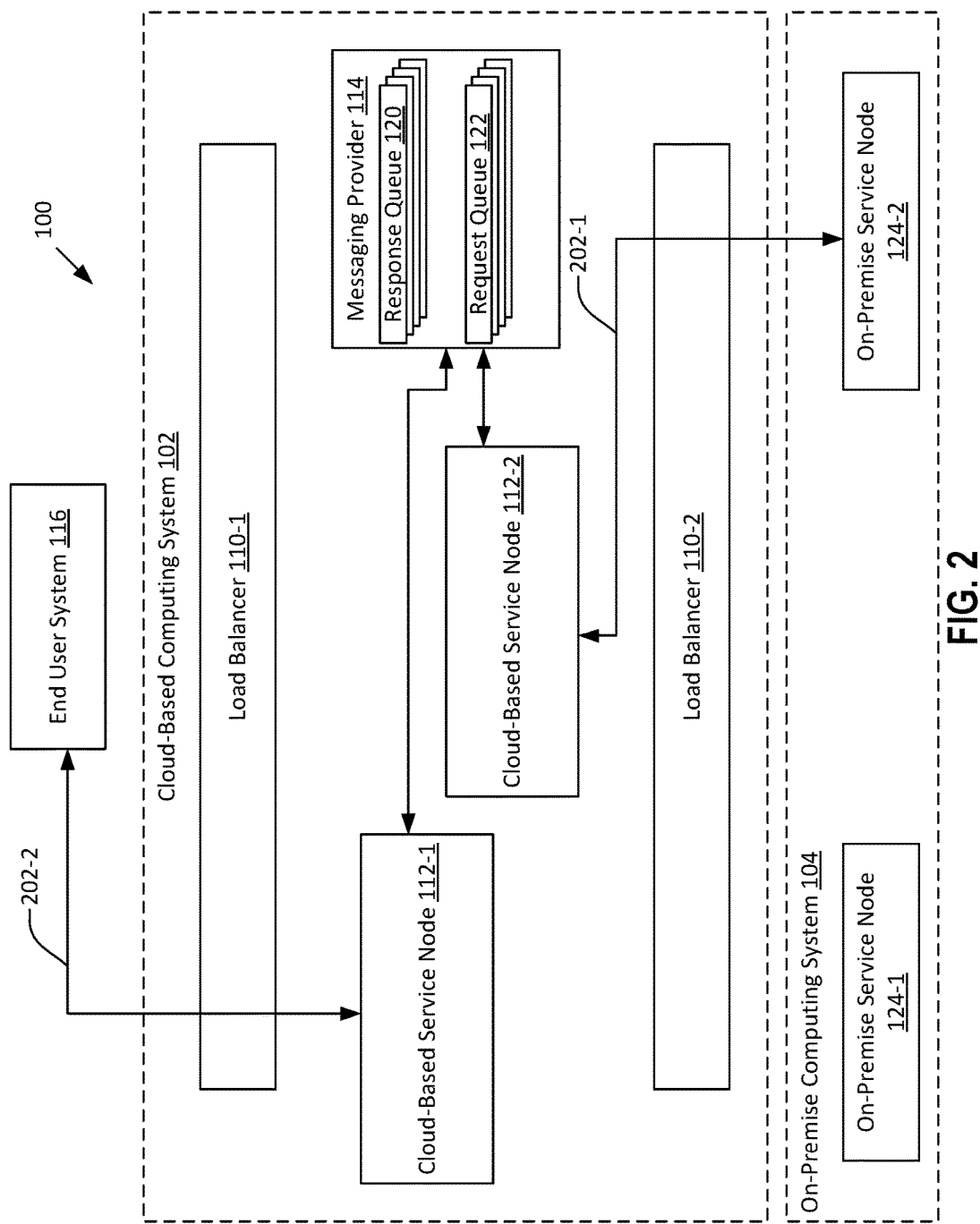
FIG. 2 is a block diagram of the hybrid cloud computing system of FIG. 1, illustrating connections between on-premise service nodes and cloud-based service nodes as well as between end user system and cloud-based service nodes, according to an example.

FIG. 2 is a block diagram of hybrid cloud computing system 100 of FIG. 1, illustrating connections between on-premise service nodes 124 and cloud-based service nodes 112 as well as between end user system 116 and cloud-based service nodes 112, according to an example. Hybrid cloud computing system 100, shown in FIG. 2, is the same as that shown in FIG. 1. However, for clarity of illustration, several details illustrated in FIG. 1 are not shown in FIG. 2.

In FIG. 2, an on-premise service node 124-2 has an open connection 202-1 to cloud-based computing system 102 (specifically, to cloud-based service node 112-2). Generally, when an on-premise service node 124 opens a connection, the on-premise service node does not need to specify (and often does not specify) which specific computing resource (such as which specific cloud-based service node 112) within cloud-based computing system 102 the connection is to be formed with. Instead, a load balancer 110-2 selects one of the cloud-based service nodes to handle the connection as described above. Conceptually, an on-premise service node 124-2 opens a connection to the cloud-based computing system 102 "as a whole" and views load balancer 110-2 as a proxy for the entire cloud-based computing system 102. In FIG. 2, load balancer 110-2 has directed traffic from on-premise service node 124-2 to cloud-based service node 112-2 and thus a connection 202-1 is formed between on-premise service node 124-2 and cloud-based service node 112-2. For similar reasons, end user system 116 does not specify a particular cloud-based service node 112, but simply requests a connection to hybrid cloud computing system 100 as a whole. Load balancer 110 receives this request, selects a cloud-based service node 112, and connects end user system 116 to the selected cloud-based service node. In FIG. 2, the selected cloud-based service node is cloud-based service node 112-1, forming connection 202-2.

Note that the cloud-based service node to which end user system 116 is connected (i.e., cloud-based service node 112-1) is different from the cloud-based service node to which on-premise service node 124-2 is connected (i.e., cloud-based service node 112-2). However, traffic to/from end user system 116 may need to be processed by on-premise service node 124-2. Note also that load balancer 110-1 is generally unable to determine that traffic from end user system 116 is intended to be handled by on-premise service node 124-2 because such a determination is likely to require deep inspection or processing of the messages transmitted by end user system 116, which is not in the realm of the functionality of load balancer 110. Again, load balancer simply chooses a cloud-based service node 112 to handle incoming traffic based on load-related factors of cloud-based service nodes 112. To require that load balancer 110 be able to "understand" messages from end user system 116 would strain the abilities of load balancer 110-1, whose job is to pass traffic off as quickly as possible to an available cloud-based service node 112. Thus it may happen that messages intended for processing in one on-premise service node 124 are handled by a cloud-based service node 112 with no direct connection to the intended on-premise service node 124.

Note that selection of a particular on-premise service node 124 to handle a message from end user system 116 may be done based on the type of message received and/or the content of the message received from end user system 116. In one example, end user system 116 may request services be performed by a particular service. A cloud-based service node 112 may "know" that a particular on-premise service node 124 (such as on-premise service node 124-2) executes that service but that a different on-premise service node (such as on-premise service node 124-1) does not execute that service. Thus, based on the content of the message, cloud-based service node 112 would know to transmit a particular message to on-premise service node 124-2 and not to on-premise service node 124-1.

Note that an end user system 116 may specify which cloud-based service node 112 to connect to. This would allow end user system 116 to connect to the same cloud-based service node to which the on-premise service node that is to responds to a request is connected to. However, informing end user system 116 of which cloud-based service node 112 to connect may cause large amounts of latency in overall communication between end user system 116 and on-premise service node 124.

In one example, use of such a mechanism would involve the following steps: end user system 116 requests a connection to cloud-based computing system 102; at cloud-based computing system 102, load balancer 110-1 receives the request and directs the request to cloud-based service node 112-1 based on load balancing factors; cloud-based service node 112-1 examines the request and determines that the request should be serviced by on-premise service node 124-2 but that cloud-based service node 112-1 does not have a connection to on-premise service node 124-2; cloud-based service node 112-1 examines a list of connections between cloud-based service nodes 112 and on-premise service nodes 124 (list not illustrated in FIG. 2) and determines that cloud-based service node 112-2 has a connection to on-premise service node 124-2; cloud-based service node 112-1 returns a response to end user system 116 instructing end user system 116 to specify that connection to cloud-based service node 112-2 is desired; end user system 116 sends a request to cloud-based computing system 102, specifying that connection to cloud-based service node 112-2 is required (via, e.g., a browser cookie). At this point, cloud-based service node 112-2 is able to relay communications between end user system 116 and on-premise service node 124-2. However, many back and forth "hops" were required in order to establish this connection. Note that when cloud-based service node 112-1 determines that it does not have a connection to on-premise service node 124-2, cloud-based service node 112-1 cannot simply open such a connection because on-premise computing system 104 does not accept incoming connections for security reasons.

Thus techniques described herein use a messaging provider 114 to pass messages between cloud-based service nodes 112 in order to direct traffic between end user system 116 and on-premise service nodes 124 as desired. This message passing avoids the multiple hops described above and improves communication involving hybrid cloud system 100.

Broadly described, whenever a cloud-based service node 112 receives a request from an end user system 116 that is to be handled by an on-premise service node 124 for which that cloud-based service node 112 does not have a connection, the cloud-based service node constructs and transmits a message to a request queue 122 within messaging provider 114, the request queue 122 being associated with the destination on-premise service node. Each request queue 122 is assigned to a particular on-premise service node 124. Cloud-based service nodes 112 that have an open connection to a particular on-premise service node 124 listen for messages in ("subscribe to") request queues 122 associated with those on-premise service nodes 124. By writing messages to a request queue 122 associated with a particular on-premise service node 124, a cloud-based service node 112 effectively passes that message to another cloud-based service node 112 that has a connection to the destination on-premise service node. Note that the cloud-based service node that transmits the message to the request queue may be the same cloud-based service node as the cloud-based service node that listens for and thereby obtains the message from the request queue. In other words, the same cloud-based service node may transmit a message to the request queue and receive that same message back from the request queue as the cloud-based service node that holds the appropriate connection to the on-premise service node.

For asynchronous communication, request queues 122 are sufficient. For synchronous communication, on-premise service nodes 124 returns responses that eventually are transmitted to end user system 116. For such messages, messaging provider 114 also stores response queues 120. Each response queue 120 is associated with a request from a particular end user system 116 and thus with the cloud-based service node that holds an open connection to that end user system 116. Only those cloud-based service nodes 112 that hold a connection to a particular end user system 116 listen to ("subscribe to") response queues 120 associated with such end user system 116. Through this mechanism, on-premise service nodes 124 are able to transmit responses to a particular end user system 116 despite not holding a connection to a cloud-based service node 112 that has a connection to that end user system 116.

Messages that are stored in response queues 120 and request queues 122 and are handled by messaging provider 114 are said to "encapsulate" an underlying "raw" transmission (e.g., HTTP request or HTTP response). Such messages include a unique "destination identifier" that uniquely identifies the destination for a response (e.g., a particular on-premise service node 124 or a particular end user system 116) as well as the "raw" communication actually received from end user system 116. The destination identifier may include a unique identifier of the entity to which the message is directed. For on-premise service nodes 124, this may include a unique ID of the on-premise computing system 104 as well as a unique ID of the particular on-premise service node 124, and for end user systems 116, this may include a unique identifier of the end user system 116 as well as a unique identifier tagging which message is being returned. The "raw" communication may be converted to a javascript object notation ("JSON") object.

Messages may also include: a message type, a timestamp, which is the time when the message is created, an expiration time, which is the time at which messaging provider 114 may discard the message, and a message signature, which may be a security signature generated by a cloud-based service node 112 prior to sending the message to an on-premise service node 124. The use of a message signature helps prevent man-in-the-middle attacks by enabling the on-premise service node to verify the sender of the message. Specifically, the message signature may be a private key signature associated with the sending cloud-based service node which can be verified (by an on-premise service node 124) using the public key of the sending cloud-based service node (via public key encryption).

Note that messaging provider 114 may be embodied as a software process or collection of software processes executing within a physical computer (with, e.g., a processor and memory storing instructions that cause the processor to perform steps associated with the messaging provider 114) and/or within a virtual machine executing within cloud-based computing system 102. Messaging provider 114 may execute within a virtual or physical machine that is the same as one of the cloud-based service nodes 112 or may execute in a virtual or physical machine that is independent of each cloud-based service node 112. One example of a messaging provider that may implement some aspects of messaging provider 114 is RabbitMQ (see, e.g., https://www.rabbitmq.com/).

As described above, to be able to receive messages from a cloud-based service node 112, an on-premise service node 124 establishes a connection with a cloud-based service node 112. Techniques for establishing such a connection, for receiving messages from a cloud-based service node 112, and for sending a response to the cloud-based service node 112 after processing, are now described with respect to FIG. 3.

Figure 3:
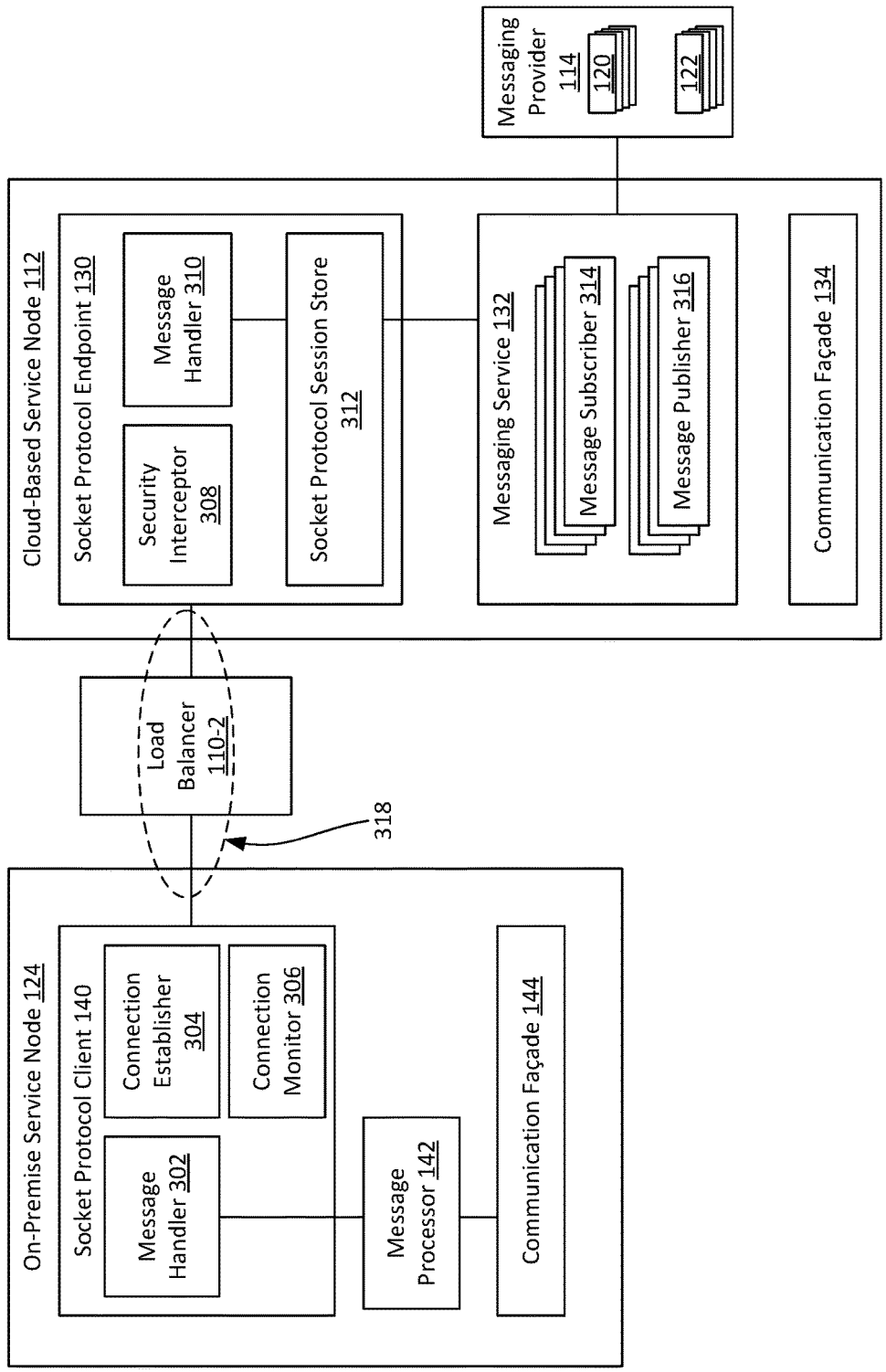
FIG. 3 is a block diagram that illustrates aspects of communication between an on-premise service node and a cloud-based service node, according to an example.

FIG. 3 is a block diagram that illustrates communication between an on-premise service node 124 and a cloud-based service node 112, according to an example. On-premise service node 124 includes socket protocol client 140, message processor 142, and communication façade 144. Socket protocol client 140 includes message handler 302, connection establisher 304, and connection monitor 306. Cloud-based service node 112 includes socket protocol endpoint 130, messaging service 132, and communication façade 134. Socket protocol endpoint 130 includes security interceptor 308, message handler 310, and socket protocol session store 312. Messaging service 132 includes message subscribers 314 and message publishers 316.

Socket protocol client 140 may be a software module that executes on a hardware platform (with, e.g., a processor and a memory storing instructions configured to cause the processor to perform appropriate steps) and that is configured to establish a socketed communication connection with socket protocol endpoint 130 of cloud-based service node 112. Socket protocol endpoint 130 may also be a software module that executes on a hardware platform (with, e.g., a processor and a memory storing instructions configured to cause the processor to perform appropriate steps) and that is configured to establish a socketed communication connection with socket protocol client 140 of on-premise service node 124.

Socket protocol client 140 and socket protocol endpoint 130 may implement at least some aspects of a Websocket-like protocol such as SockJS. SockJS allows for a full-duplex TCP connection to be established using the HTTP protocol. With a socketed communication connection established between on-premise service node 124 and cloud-based service node 112, cloud-based service node 112 may send messages to on-premise service node 124. Connection establisher 304 establishes a connection with cloud-based service node 112 using a handshake technique. Note that although a socketed protocol is described, other protocols may be used by socket protocol client 140 and socket protocol endpoint 130, such as HTTP streaming or long polling. These other protocols, while not necessarily comprising a flexible full-duplex protocol such as SockJS, allow cloud-based service node 112 to pass information to on-premise service node 124 despite not being able to open a connection to on-premise service node 124.

To establish a connection with cloud-based service node 112, connection establisher 304 transmits a request to initiate a handshaking operation to load balancer with the cloud-based service node 112. The handshaking operation negotiates a specific protocol to use (e.g., SockJS, HTTP streaming, etc), performs handshaking with the negotiated protocol, notifies message handlers 302 and message handler 310 that a connection has been established, and begins transmitting messages if any are available. Connection establisher 304 also transmits an authorization token (such as an OAuth2 token) that includes token data for authentication purposes as well as a unique identifier ("ID") of the on-premise service node. The authorization token is received and validated by security interceptor 308 and stored for later use. In one example, the unique ID includes a name of the organization that owns and/or operates the on-premise service node as well as a unique identifier for the on-premise service node. This combination of unique IDs uniquely specifies the on-premise service node that establishes the connection with the cloud-based service node. The authorization token is later used when cloud-based service node 112 receives a response from the on-premise service node in order to verify the identity of that on-premise service node. When a connection is established, message handler 310 stores, within socket protocol session store 312, an indication that such a connection is established, including the unique ID associated with the on-premise service node that is participating in the connection.

Connection monitor 306 monitors open connection 318 between on-premise service node 124 and cloud-based service node 112 (where connection 318 may be mediated by load balancer 110-1). In one example, to monitor open connection 318, connection monitor 306 periodically transmits a test message to cloud-based service node 112. If an acknowledgment is received from cloud-based service node 112 within a timeout period, then the connection is still open and connection monitor 306 does not attempt to perform any further actions (such as attempting to reconnect). If an acknowledgment is not received from cloud-based service node 112 within the timeout period, then connection monitor 306 instructs connection establisher 304 to perform a handshaking technique (such as the handshaking technique described above) to establish a connection with cloud-based service node 112. After detecting that a connection no longer exists, connection monitor 306 may try again repeatedly, each time increasing the amount of time between retries by a certain factor. For example, connection monitor 306 may increase the time between retries by setting the amount of time equal to 2 times the number of times that reconnection failed, in minutes (e.g., if reconnection failed 2 times previously, then connection monitor 306 waits for 4 minutes).

Message handler 302 (within socket protocol client 140 of on-premise service node 124) receives messages transmitted by cloud-based service node 112 over connection 318. Message handler 302, which is considered to be a part of socket protocol client 140 (e.g., part of a software suite whose purpose is to establish and communicate via connection 318), passes such messages to message processor 142, which is outside of socket protocol client 140 (e.g., an entity separate from the above-mentioned software suite for establishing and communicating via connection 318). Passing messages simply means retransmitting messages received from cloud-based service node 112 to message processor 142 for further processing.

Message processor 142 converts the message to a binary format such as a Java bean so that data in the message can be read, constructs an HTTP request based on the Java bean, and forwards the HTTP request to the appropriate local service for handling. The appropriate local service (not shown) may be determined based on various information within the message and Java bean. The local service processes the HTTP request as if it had received the HTTP request through a more traditional channel and generates an HTTP response, passing the HTTP response back to message processor 142. Message processor 142 forwards the response to communication façade 144. As on-premise service node 124 is able to open a connection to cloud-based service node 112, communication façade 144 simply transmits the response to cloud-based service node 112, where messaging service 132 receives the response. Communication façade 144 transmits the authorization token to messaging service 132 so that messaging service 132 may verify the identity of on-premise service node 124. Specifically, messaging service 132 validates the received authorization token received from the on-premise service node.

Communication façade 134 within cloud-based service node 112 acts as an API that allows cloud-based service node 112 to send a message to an on-premise service node 124. When invoked to transmit a message to an on-premise service node 124, communication façade 134 creates a destination (discussed in FIG. 4—the destination is a "relay point" within messaging provider 114 for a message and serves to direct messages published to messaging provider 114 to a particular queue), creates a message subscriber 314 for the response, and includes the destination identifier in the message sent to on-premise service node 124.

Within messaging service 132, message publishers 316 and message subscribers 314 interface with messaging provider 114 to communicate messages among cloud-based service nodes 112. Each cloud-based service node includes a message subscriber 314 that subscribes to each request queue 122 for which the cloud-based service node has a connection to an on-premise service node 124 and a message publisher 316 that publishes to a request queue 122 associated with a particular on-premise service node 124. Cloud-based service nodes 112 also include message publishers 316 and message subscribers 314 for response queues 120. Specifically, each cloud-based service node includes a message subscriber 314 that subscribes to each response queue 120 for which the cloud-based service node has a connection to an end user system 116 and a message publisher 316 that publishes to a response queue 120 associated with a particular end user system 116.

Figure 4:
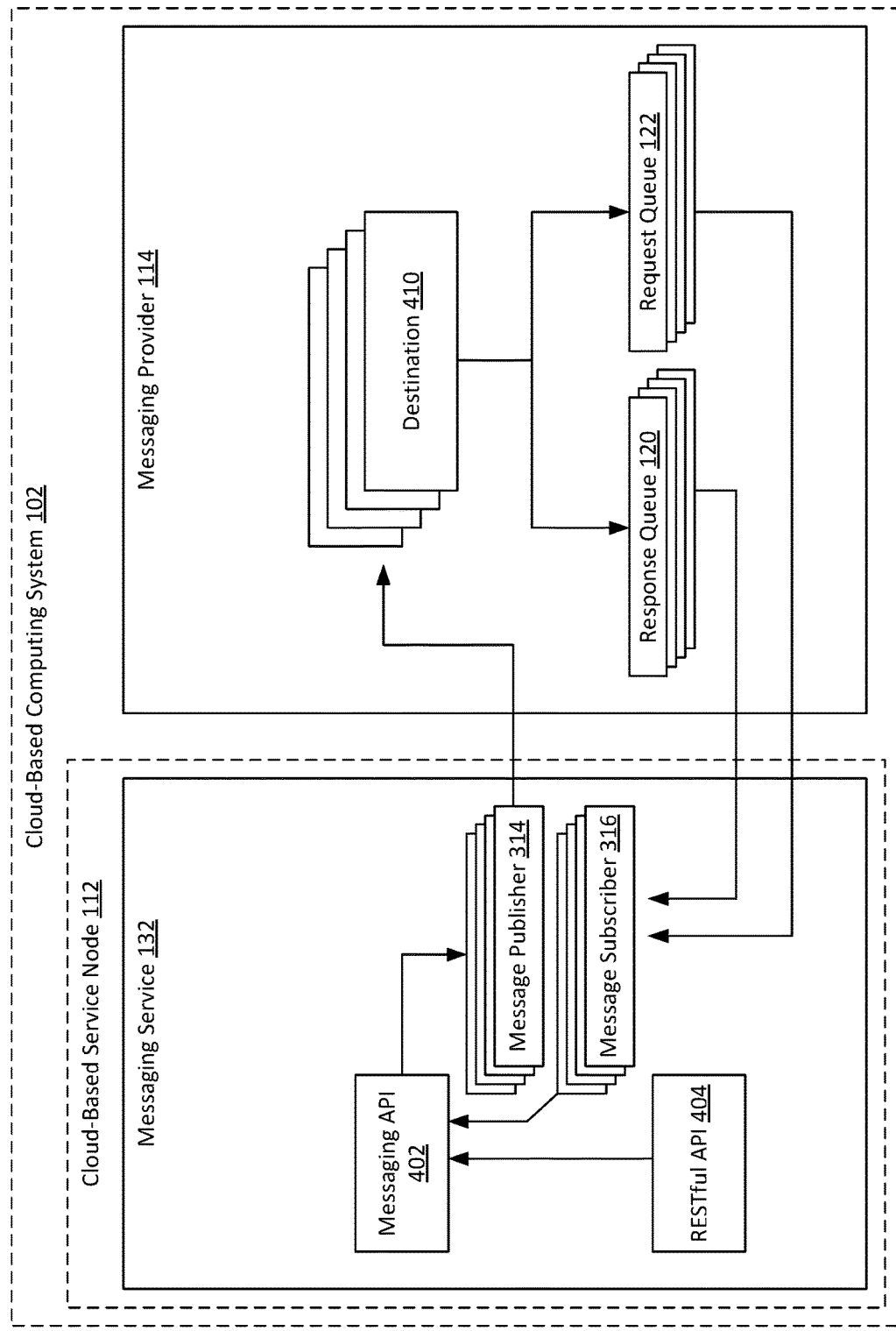
FIG. 4 illustrates aspects of the messaging provider of FIGS. 1 and 2 in greater detail, according to an example.

FIG. 4 illustrates aspects of messaging provider 114 in greater detail, according to an example. As shown, FIG. 4 includes cloud-based computing system 102, which includes cloud-based service node 112 and messaging provider 114. Cloud-based service node 112 includes messaging service 132, including messaging application programming interface ("API") 402, RESTful API 404 (where "REST" stands for "representational state transfer"), message subscribers 316, and message publishers 314. Messaging provider 114 includes "destinations" 410, response queues 120, and request queues 122. Note that FIG. 4 presents a simplified view of cloud-based computing system 102 in that only one cloud-based service node 112 is illustrated. It should be understood, however, that multiple cloud-based service nodes 112 may be present in cloud-based computing system 102.

In some embodiments, when an on-premise service node 124 establishes a connection with a cloud-based service node 112, that cloud-based service node creates a message subscriber 316 associated with the connected on-premise service node. That message subscriber 316 is subscribed to a particular request queue 122 that is associated with the unique identifier of the on-premise service node that established the connection. When a message is placed into a particular queue, messaging provider 114 pushes that message to the message subscriber that is subscribed to that queue. Similarly, when an end user system 116 establishes a connection to cloud-based service node 112, that cloud-based service node creates a message subscriber 316 that is subscribed to a response queue 120 associated with the end user system 116. When a response message is placed in such a response queue 120, message provider 114 pushes that message to the cloud-based service node subscribed to that response queue 120.

Messaging service 132 also creates message publishers 314 to publish messages to particular queues. A destination 410 is a functional unit that receives requests to publish messages to particular queues. Message publishers 314 do not directly write to queues in messaging providers 114 but instead transmit such messages to destinations 410. When a destination 410 receives a request to publish a message, the destination 410 identifies one or more queues associated with the message and writes the message to such queues. The destination 410 pushes the message to each queue bound to that destination 410. A destination 410 is bound to a particular queue when that queue is created. In other words, when any particular queue is created, a particular destination, associated with that queue, is bound to the created queue.

Within messaging service 132, message subscribers 316 subscribe to particular queues, including request queues 122 and response queues 120. When a particular cloud-based service node 112 receives a transmission from an end user system 116, that cloud-based service node 112 determines which on-premise service node 124 that message is directed to and publishes a message associated with the received transmission (via a message publisher 314) to a request queue 122 associated with the identified on-premise service node. Messaging provider 114 knows which cloud-based service node 112 is subscribed to that request queue 122 and pushes such message to the message subscriber 316 subscribed to that request queue 122. That cloud-based service node receives the message and transmits the message to the appropriate on-premise service node (to which it is connected) for processing. As described above, the on-premise service node processes the message, generates a new message intended as a response to end user system 116 and transmits the response to cloud-based service node. Specifically, communication façade 144 of the on-premise service node generates an HTTP request including the response message and transmits the HTTP request to the messaging service 132.

RESTful API 404 is called as a result of the received HTTP request and calls messaging API 402 to transmit the received message to an appropriate response queue 120 in messaging provider 114. RESTful API 404 is essentially an HTTP front end for messaging API 402 that is able to receive communications from on-premise service nodes over a computer network such as the Internet. Upon receiving a message, RESTful API 404 invokes messaging API 402 to invoke a message publisher 316 in order to publish a message to an appropriate response queue 120. Messaging provider 114 then pushes that message to the cloud-based service node that is subscribed to the response queue. That cloud-based service node transmits the response to the end user system 116. Note that communication façade 144 of the on-premise service node includes the authorization token in the HTTP request to RESTful API. RESTful API decodes and validates the authorization token.

Figure 5:
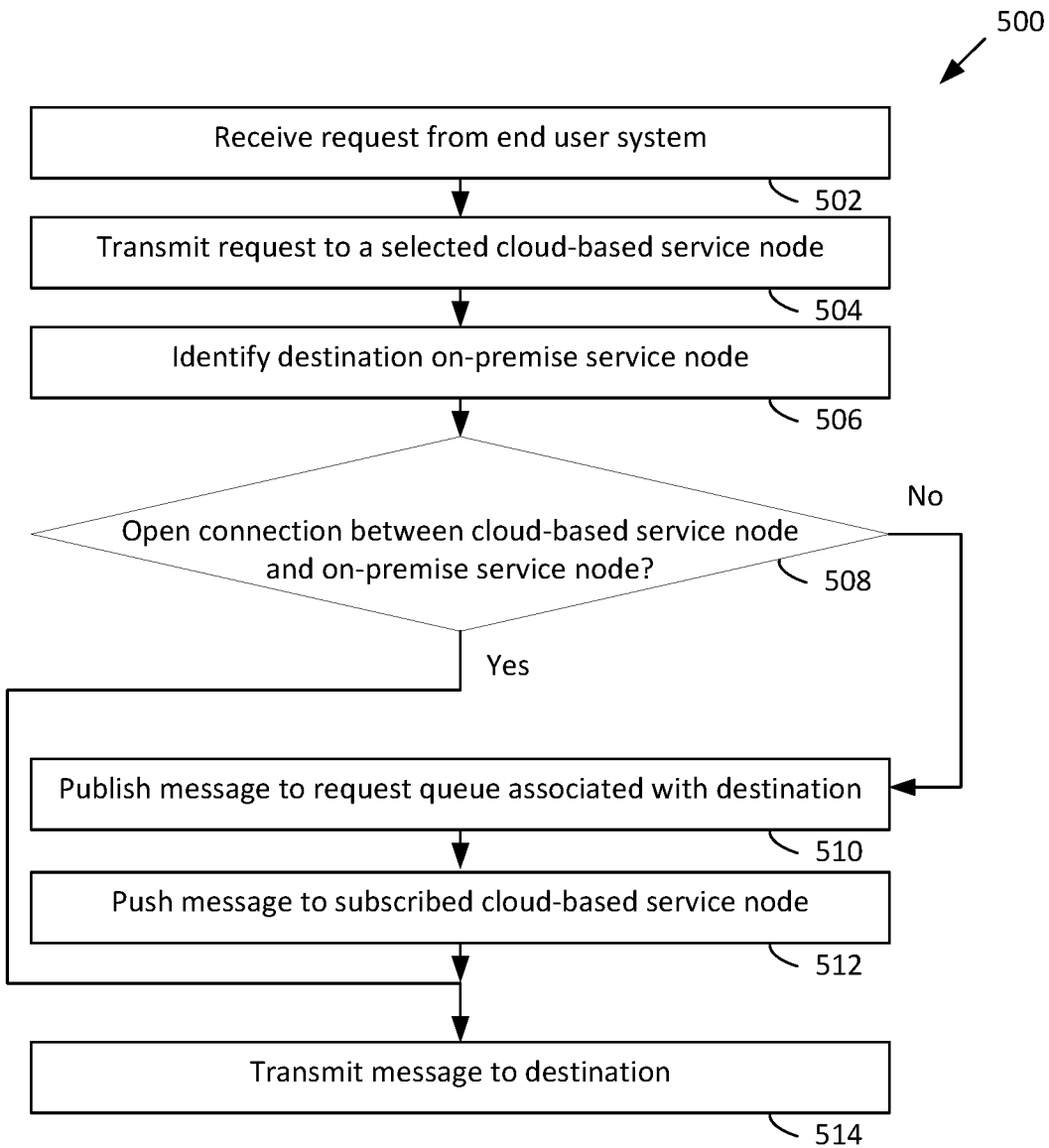
FIG. 5 is a flow diagram of a method for transmitting messages to on-premise service nodes within a hybrid computing system, according to an example.

FIG. 5 is a flow diagram of a method 500 for transmitting messages to on-premise service nodes within a hybrid computing system, according to an example. Note that although method 500 is described with reference to the systems described in FIGS. 1-4, any system configured to perform the steps of method 500, in various technical feasible orders, is within the scope of the present disclosure.

As shown, a method 500 begins at step 502, where a load balancer 110 receives a request from an end user system 116. The request may be an HTTP request. At step 504, load balancer 110 identifies a cloud-based service node 112 to handle the HTTP request and transmits the HTTP request to the cloud-based service node 112. At step 506, cloud-based service node examines the HTTP request and identifies a destination on-premise service node 124. At step 508, cloud-based service node determines whether it has an open connection to that on-premise service node 124. If the cloud-based service node has such an open connection, the method proceeds to step 514 and if the cloud-based service node does not have such an open connection, the method proceeds to step 510.

At step 510, the cloud-based service node publishes a message that includes the HTTP request to a request queue associated with the destination. Such a request queue is associated with a unique identifier that uniquely identifies the destination on-premise service node. If such a request queue does not exist, then the act of requesting messaging provider 114 to store the message causes messaging provider 114 to create such a request queue.

At step 512, messaging provider 114 pushes the message to a subscribed cloud-based service node 112, if any exists. Such a cloud-based service node would exist if the destination on-premise service node 124 has an open connection to a cloud-based service node and would not exist if no such connection existed. At step 514, the cloud-based service node that has the message transmits the message to the destination on-premise service node.

Figure 6:
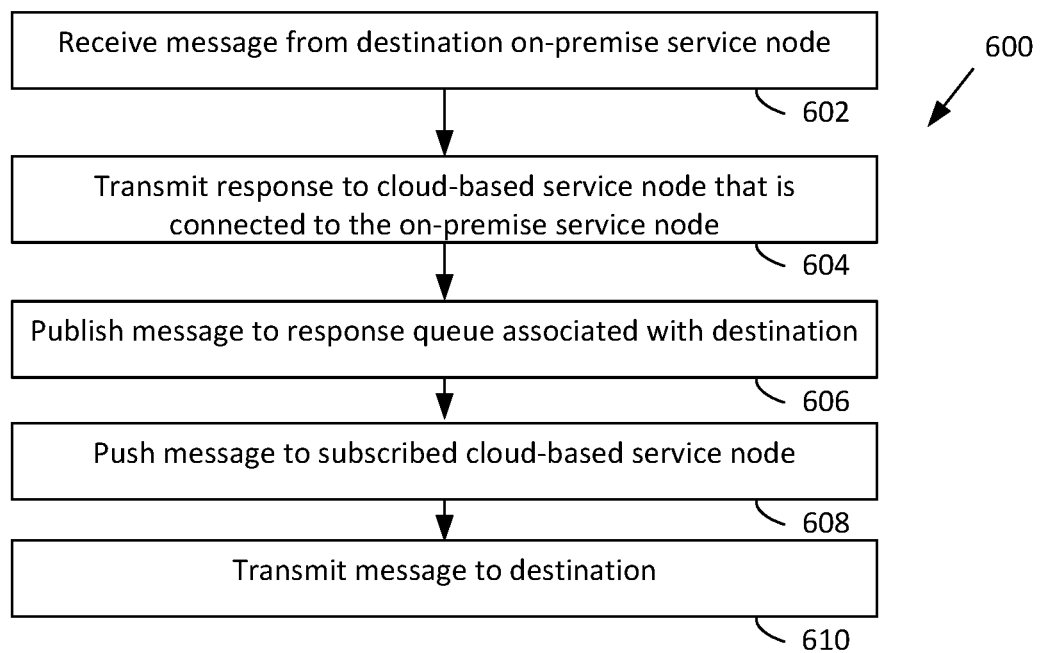
FIG. 6 is a flow diagram of a method for transmitting response messages from an on-premise service node to an end user system, according to an example.

FIG. 6 is a flow diagram of a method 600 for transmitting response messages from an on-premise service node to an end user system 116, according to an example. Note that although method 600 is described with reference to the systems described in FIGS. 1-4, any system configured to perform the steps of method 600, in various technical feasible orders, is within the scope of the present disclosure.

As shown, a method 600 begins at step 602, where load balancer 110-2 receives a message from a destination on-premise service node, which is the service node that processed the HTTP request. At step 604, load balancer 110-2 transmits the response to the cloud-based service node that is connected to the on-premise service node. At step 606, the cloud-based service node publishes the message to a response queue associated with the end user system. At step 608, messaging provider 114 pushes the message to a subscribed cloud-based service node 112. This cloud-based service node 112 will be the one that received the original request from load balancer 110-1. At step 610, the cloud-based service node transmits the message to the end user system.

Figure 7:
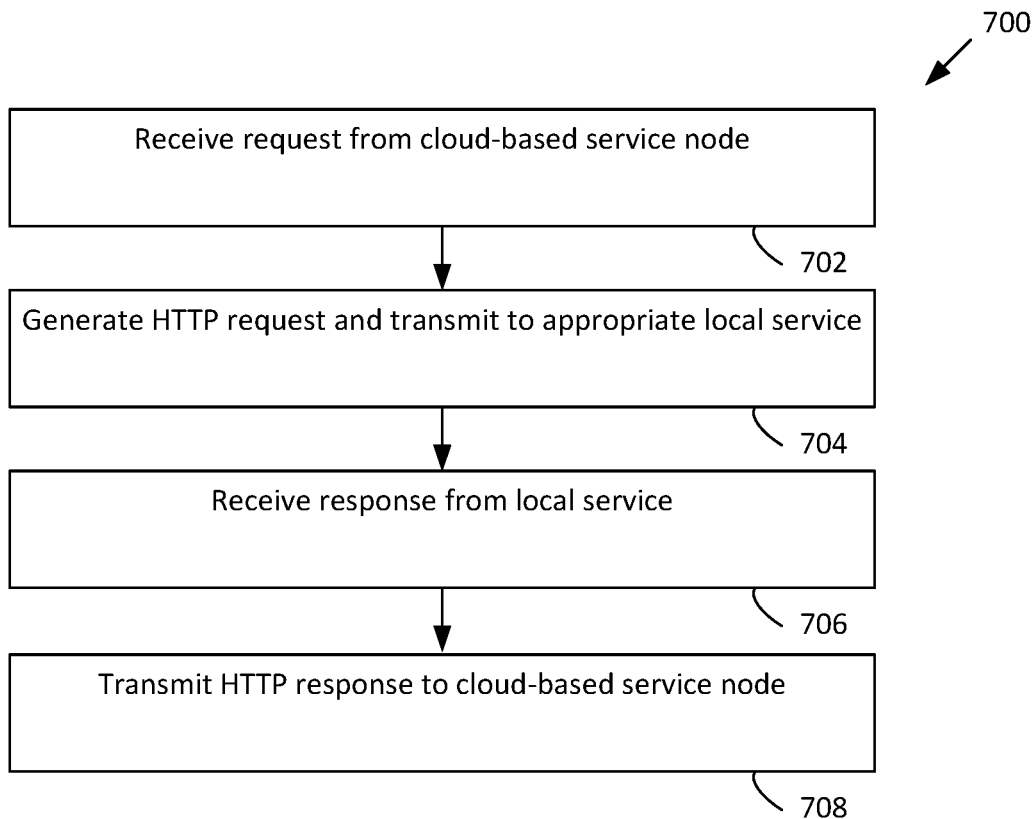
FIG. 7 is a flow diagram of a method for receiving, processing, and sending a response for a message received from cloud-based computer system, according to an example.

FIG. 7 is a flow diagram of a method 700 for receiving, processing, and sending a response for a message received from cloud-based computer system 102, according to an example. Note that although method 700 is described with reference to the systems described in FIGS. 1-4, any system configured to perform the steps of method 700, in various technical feasible orders, is within the scope of the present disclosure.

As shown, a method 700 begins at step 702, where on-premise service node receives a request from a cloud-based service node. At step 704, on-premise service node generates an HTTP request based on the message and transmits the request to an appropriate local service. At step 706, on-premise service node receives a response from the local service. At step 708, on-premise service node transmits a response message to the cloud-based computing system 102.

Figure 8:
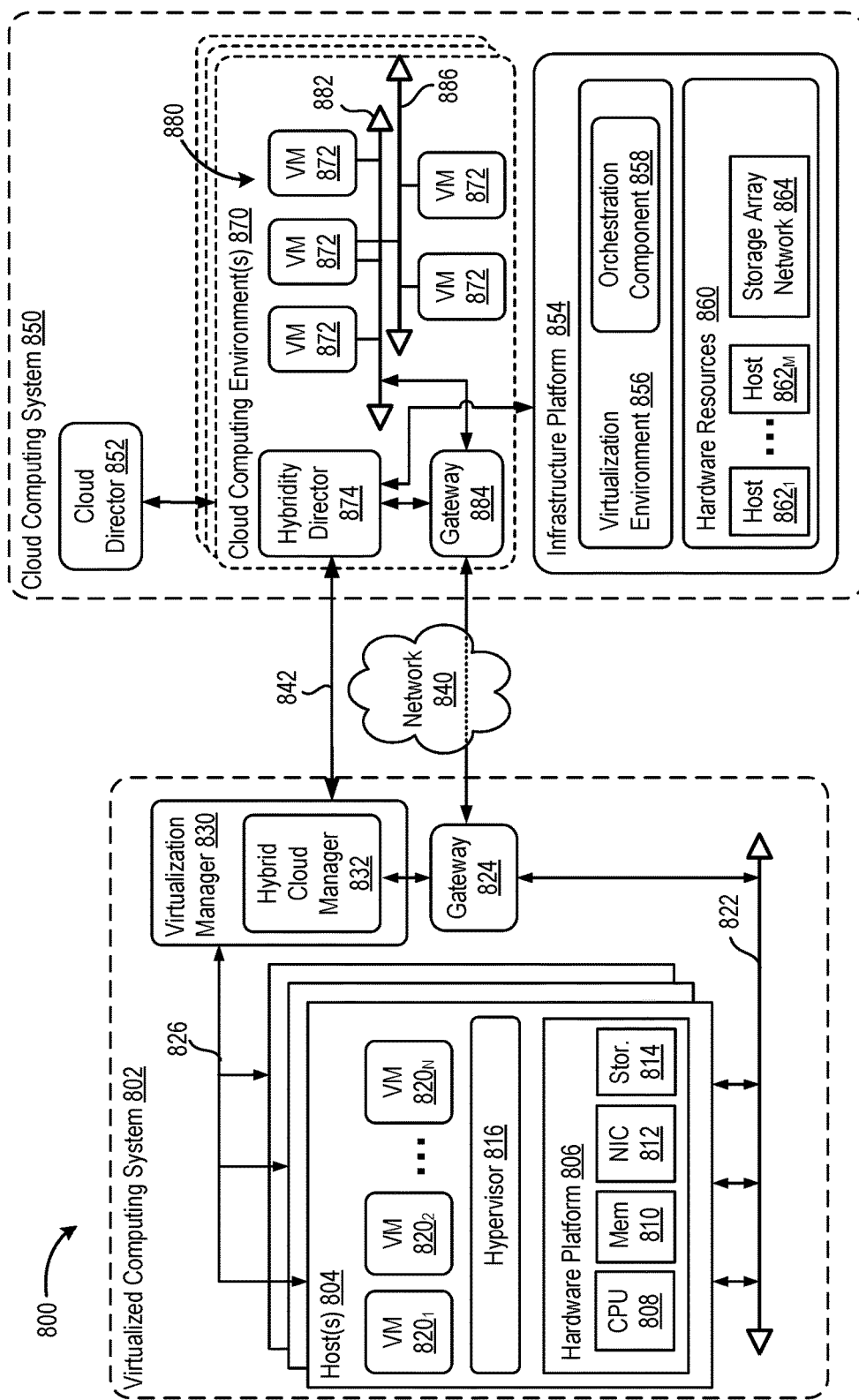
FIG. 8 is a block diagram of a hybrid cloud computing system that may implement aspects of the hybrid cloud system illustrated in FIG. 1, according to an example.

FIG. 8 is a block diagram of a hybrid cloud computing system 800 that may implement aspects of the hybrid cloud system illustrated in FIG. 1, according to an example. Hybrid cloud computing system 800 includes a virtualized computing system 802 and a cloud computing system 850, and is configured to provide a common platform for managing and executing virtual workloads seamlessly between virtualized computing system 802 and cloud computing system 850. Virtualized computing system 802 may comprise on-premise computing system 104 of FIG. 1 and cloud computing system 850 may comprise cloud-based computing system 102 of FIG. 1.

Virtualized computing system 802 includes one or more host computer systems 804. Hosts 804 may be constructed on a server grade hardware platform 806, such as an x86 architecture platform, a desktop, and a laptop. As shown, hardware platform 806 of each host 804 may include conventional components of a computing device, such as one or more processors (CPUs) 808, system memory 810, a network interface 812, storage 814, and other I/O devices such as, for example, a mouse and keyboard (not shown). Processor 808 is configured to execute instructions, for example, executable instructions that perform one or more operations described herein and may be stored in memory 810 and in local storage. Memory 810 is a device allowing information, such as executable instructions, cryptographic keys, virtual disks, configurations, and other data, to be stored and retrieved. Memory 810 may include, for example, one or more random access memory (RAM) modules. Network interface 812 enables host 804 to communicate with another device via a communication medium, such as a network 822 within virtualized computing system 802. Network interface 812 may be one or more network adapters, also referred to as a Network Interface Card (NIC). Storage 814 represents local storage devices (e.g., one or more hard disks, flash memory modules, solid state disks, and optical disks) and/or a storage interface that enables host 804 to communicate with one or more network data storage systems. Examples of a storage interface are a host bus adapter (HBA) that couples host 804 to one or more storage arrays, such as a storage area network (SAN) or a network-attached storage (NAS), as well as other network data storage systems.

Each host 804 is configured to provide a virtualization layer that abstracts processor, memory, storage, and networking resources of hardware platform 806 into multiple virtual machines $820_1$ to $820_N$ (collectively referred to as VMs 820) that run concurrently on the same hosts. VMs 820 run on top of a software interface layer, referred to herein as a hypervisor 816, that enables sharing of the hardware resources of host 804 by VMs 820. One example of hypervisor 816 that may be used in an embodiment described herein is a VMware ESXi hypervisor provided as part of the VMware vSphere solution made commercially available from VMware, Inc. Hypervisor 816 may run on top of the operating system of host 804 or directly on hardware components of host 804.

Virtualized computing system 802 includes a virtualization management module (depicted in FIG. 8 as virtualization manager 830) that may communicate to the plurality of hosts 804 via a network, sometimes referred to as a management network 826. In one embodiment, virtualization manager 830 is a computer program that resides and executes in a central server, which may reside in virtualized computing system 802, or alternatively, may run in a VM in one of hosts 804. One example of a virtualization management module is the vCenter Server™ product made available from VMware, Inc. Virtualization manager 830 is configured to carry out administrative tasks for computing system 802, including managing hosts 804, managing VMs 820 running within each host 804, provisioning VMs, migrating VMs from one host to another host, and load balancing between hosts 804.

In one embodiment, virtualization manager 830 includes a hybrid cloud management module (depicted as hybrid cloud manager 832) configured to manage and integrate virtual computing resources provided by cloud computing system 850 with virtual computing resources of computing system 802 to form a unified "hybrid" computing platform. Hybrid cloud manager 832 is configured to deploy VMs in cloud computing system 850, transfer VMs from virtualized computing system 802 to cloud computing system 850, and perform other "cross-cloud" administrative task, as described in greater detail later. In one implementation, hybrid cloud manager 832 is a module or plug-in complement to virtualization manager 830, although other implementations may be used, such as a separate computer program executing in a central server or running in a VM in one of hosts 804.

In one embodiment, hybrid cloud manager 832 is configured to control network traffic into network 822 via a gateway component (depicted as a gateway 824). Gateway 824 (e.g., executing as a virtual appliance) is configured to provide VMs 820 and other components in virtualized computing system 802 with connectivity to an external network 840 (e.g., Internet). Gateway 824 may manage external public IP addresses for VMs 820, route traffic incoming to and outgoing from virtualized computing system 802 and provide networking services, such as firewalls, network address translation (NAT), dynamic host configuration protocol (DHCP), load balancing, and virtual private network (VPN) connectivity over a network 840.

In one or more embodiments, cloud computing system 850 is configured to dynamically provide an enterprise (or users of an enterprise) with one or more virtual data centers 880 in which a user may provision VMs 820, deploy multi-tier applications on VMs 820, and/or execute workloads. Cloud computing system 850 includes an infrastructure platform 854 upon which a cloud computing environment 870 may be executed. In the particular embodiment of FIG. 8, infrastructure platform 854 includes hardware resources 860 having computing resources (e.g., hosts $862_1$ to $862_N$), storage resources (e.g., one or more storage array systems, such as SAN 864), and networking resources, which are configured in a manner to provide a virtualization environment 856 that supports the execution of a plurality of virtual machines 872 across hosts 862. It is recognized that hardware resources 160 of cloud computing system 850 may in fact be distributed across multiple data centers in different locations.

Each cloud computing environment 870 is associated with a particular tenant of cloud computing system 850, such as the enterprise providing virtualized computing system 802. In one embodiment, cloud computing environment 870 may be configured as a dedicated cloud service for a single tenant comprised of dedicated hardware resources 860 (i.e., physically isolated from hardware resources used by other users of cloud computing system 850). In other embodiments, cloud computing environment 870 may be configured as part of a multi-tenant cloud service with logically isolated virtual computing resources on a shared physical infrastructure. As shown in FIG. 8, cloud computing system 850 may support multiple cloud computing environments 870, available to multiple enterprises in single-tenant and multi-tenant configurations.

In one embodiment, virtualization environment 856 includes an orchestration component 858 (e.g., implemented as a process running in a VM) that provides infrastructure resources to cloud computing environment 870 responsive to provisioning requests. For example, if an enterprise required a specified number of virtual machines to deploy a web application or to modify (e.g., scale) a currently running web application to support peak demands, orchestration component 858 can initiate and manage the instantiation of virtual machines (e.g., VMs 872) on hosts 862 to support such requests. In one embodiment, orchestration component 858 instantiates virtual machines according to a requested template that defines one or more virtual machines having specified virtual computing resources (e.g., compute, networking, storage resources). Further, orchestration component 858 monitors the infrastructure resource consumption levels and requirements of cloud computing environment 870 and provides additional infrastructure resources to cloud computing environment 870 as needed or desired. In one example, similar to virtualized computing system 802, virtualization environment 856 may be implemented by running on hosts 862 VMware ESX™-based hypervisor technologies provided by VMware, Inc. of Palo Alto, Calif. (although it should be recognized that usage of any other virtualization technologies, including Xen® and Microsoft Hyper-V virtualization technologies is consistent with the teachings herein).

In one embodiment, cloud computing system 850 may include a cloud director 852 (which may be embodied as software running in one or more virtual machines or outside of virtual machines) that manages allocation of virtual computing resources to an enterprise for deploying applications. Cloud director 852 may be accessible to users via a REST (Representational State Transfer) API (Application Programming Interface) or any other client-server communication protocol. Cloud director 852 may authenticate connection attempts from the enterprise using credentials issued by the cloud computing provider.

In the embodiment of FIG. 8, cloud computing environment 870 supports the creation of a virtual data center 880 having a plurality of virtual machines 872 instantiated to, for example, host deployed multi-tier applications. A virtual data center 880 is a logical construct that provides compute, network, and storage resources to an organization. Virtual data centers 880 provide an environment where VM 872 can be created, stored, and operated, enabling complete abstraction between the consumption of infrastructure service and underlying resources. VMs 872 may be configured similarly to VMs 820, as abstractions of processor, memory, storage, and networking resources of hardware resources 860.

Virtual data center 880 includes one or more virtual networks 882 used to communicate between VMs 872 and managed by at least one networking gateway component (e.g., gateway 884), as well as one or more isolated internal networks 886 not connected to gateway 884. Gateway 884 (e.g., executing as a virtual appliance) is configured to provide VMs 872 and other components in cloud computing environment 870 with connectivity to external network 840 (e.g., Internet). Gateway 884 manages external public IP addresses for virtual data center 880 and one or more private internal networks interconnecting VMs 872. Gateway 884 is configured to route traffic incoming to and outgoing from virtual data center 880 and provide networking services, such as firewalls, network address translation (NAT), dynamic host configuration protocol (DHCP), and load balancing. Gateway 884 may be configured to provide virtual private network (VPN) connectivity over a network 840 with another VPN endpoint, such as a gateway 824 within virtualized computing system 802. In other embodiments, gateway 884 may be configured to connect to communicate with virtualized computing system 802 using a high-throughput, dedicated link (depicted as a direct connect 842) between virtualized computing system 802 and cloud computing system 850. In one or more embodiments, gateways 824 and 884 are configured to provide a "stretched" layer-2 (L2) network that spans virtualized computing system 802 and virtual data center 880, as shown in FIG. 8.

While FIG. 8 depicts a single connection between on-premise gateway 824 and cloud-side gateway 884 for illustration purposes, it should be recognized that multiple connections between multiple on-premise gateways 824 and cloud-side gateways 884 may be used. Furthermore, while FIG. 8 depicts a single instance of a gateway 884, it is recognized that gateway 884 may represent multiple gateway components within cloud computing system 850. In some embodiments, a separate gateway 884 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 850 may be used to manage all public-facing traffic incoming and outgoing from cloud computing system 850.

In one embodiment, each virtual data center 880 includes a "hybridity" director module (depicted as hybridity director 874) configured to communicate with the corresponding hybrid cloud manager 832 in virtualized computing system 802 to enable a common virtualized computing platform between virtualized computing system 802 and cloud computing system 850. Hybridity director 874 (e.g., executing as a virtual appliance) may communicate with hybrid cloud manager 832 using Internet-based traffic via a VPN tunnel established between gateways 824 and 884, or alternatively, using direct connect 842. In one embodiment, hybridity director 874 may control gateway 884 to control network traffic into virtual data center 180. In some embodiments, hybridity director 874 may control VMs 872 and hosts 862 of cloud computing system 850 via infrastructure platform 854.

The various components of hardware platform 806 may differ across different host computer systems 804. For example, the processor in one host computer system 804 may belong to the Intel family of processors while the processor in a different host computer system 804 may belong to the AMD family of processors. Processors 808 may also differ in other ways, such as processor speed, architecture bit size, and in other ways.

On-premise service nodes 124 of FIG. 1 may be embodied as software executing in VMs 820 or within hosts 804. Similarly, cloud-based service nodes may be embodied as software executing in VMs 872 or within hosts 862.

The above techniques provide for efficient, quick communication within hybrid cloud systems. The use of a messaging system allows for simple transfer of messages to off-premise computer systems that hold connections to a destination on-premise computer system. This removes the need for high latency communication consisting of many "hops."

Various figures are shown in block diagram form, with certain block elements placed within other "parent" block elements. Functionality described as being performed by any particular block element may also be said to be performed by the parent block element (as well as by parents of the parent or parents of those, etc.).

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for communicating using a hybrid cloud computing system that includes at least one on-premise computer system and at least one off-premise computer system, the method comprising:
   receiving a request at a first off-premise computer system of the hybrid cloud computing system;
   identifying an on-premise computer system of the hybrid cloud computing system to process the request;
   constructing a message to include the request and a response unique identifier identifying an external computer system from which the request was received;
   transmitting the message constructed based on the request to a request queue associated with the on-premise computer system;
   pushing the message to a second off-premise computer system of the hybrid cloud computing system that has an open connection to the on-premise computer system; and
   transmitting the message to the on-premise computer system,
   wherein the on-premise computer system is configured to not accept incoming connections, and
   wherein the first off-premise computer system and the second off-premise computer system are either the same or different off-premise computer systems.

2. The method of claim 1, further comprising:
   receiving a response message from the on-premise computer system;
   transmitting the response message to a response queue associated with an external computer system from which the request was received; and
   pushing the response message to the first off-premise computer system.

3. The method of claim 1, further comprising:
   establishing a connection from the on-premise computer system to the first off-premise computer system.

4. The method of claim 3, further comprising:
   responsive to establishing the connection, creating a message subscriber for the first off-premise computer system that is subscribed to a request queue associated with the on-premise computer system.

5. The method of claim 3, further comprising:
   responsive to establishing the connection, transmitting an authorization token from the on-premise computer system to the first off-premise computer system, the authorization token securely identifying the on-premise computer system to the first off-premise computer system.

6. The method of claim 1, further comprising:
   creating a message subscriber for the first off-premise computer system that is subscribed to a response queue associated with an external computer system from which the request was received.

7. The method of claim 1, wherein:
   the message includes an authorization token, the authorization token being associated with a user that initiated the request, the authorization token securely identifying the user to the on-premise computer system; and
   the method further comprises:
      signing the message to generate a message signature by the second off-premise computer system to securely identify the second off-premise computer system as originator of the message, and prior to processing the message by the on-premise computer system, validating the message signature by the on-premise computer system.

8. A non-transitory computer-readable medium storing instructions that, when executed by one or more processors, causes the one or more processors to perform a method, the method comprising:

receiving a request at a first off-premise computer system of a hybrid cloud computing system;

identifying an on-premise computer system of the hybrid cloud computing system to process the request;

constructing a message to include the request and a response unique identifier identifying an external computer system from which the request was received;

transmitting the message constructed based on the request to a request queue associated with the on-premise computer system;

pushing the message to a second off-premise computer system of the hybrid cloud computing system that has an open connection to the on-premise computer system; and transmitting the message to the on-premise computer system, wherein the on-premise computer system is configured to not accept incoming connections, and wherein the first off-premise computer system and the second off-premise computer system are either the same or different off-premise computer systems.

9. The non-transitory computer-readable medium of claim 8, wherein the method further comprises:

receiving a response message from the on-premise computer system;

transmitting the response message to a response queue associated with an external computer system from which the request was received; and pushing the response message to the first off-premise computer system.

10. The non-transitory computer-readable medium of claim 8, wherein the method further comprises:

establishing a connection from the on-premise computer system to the first off-premise computer system.

11. The non-transitory computer-readable medium of claim 10, wherein the method further comprises:

responsive to establishing the connection, creating a message subscriber for the first off-premise computer system that is subscribed to a request queue associated with the on-premise computer system.

12. The non-transitory computer-readable medium of claim 10, wherein the method further comprises:

responsive to establishing the connection, transmitting an authorization token from the on-premise computer system to the first off-premise computer system, the authorization token securely identifying the on-premise computer system to the first off-premise computer system.

13. The non-transitory computer-readable medium of claim 8, wherein the method further comprises:

creating a message subscriber for the first off-premise computer system that is subscribed to a response queue associated with an external computer system from which the request was received.

14. The non-transitory computer-readable medium of claim 8, wherein:

the message includes an authorization token, the authorization token being associated with a user that initiated the request, the authorization token securely identifying the user to the on-premise computer system; and the method further comprises:

signing the message to generate a message signature, by the second off-premise computer system to securely identify the second off-premise computer system as originator of the message, and prior to processing the message by the on-premise computer system, validating the message signature by the on-premise computer system.

15. A hybrid cloud system, comprising:

a first off-premise computer system;

a second off-premise computer system that has an open connection to an on-premise computer system of the hybrid cloud system; and a messaging service coupled to the first off-premise computer system, wherein the first off-premise computer system is configured to:

identify the on-premise computer system of the hybrid cloud system to process a request, and construct a message to include the request and a response unique identifier identifying an external computer system from which the request was received;

transmit the message constructed based on the request to a request queue in the messaging service associated with the on-premise computer system, wherein the messaging service is configured to push the message to the second off-premise computer system, wherein the second off-premise computer system is configured to transmit the message to the on-premise computer system, wherein the on-premise computer system is configured to not accept incoming connections, and wherein the first off-premise computer system and the second off-premise computer system are either the same or different off-premise computer systems.

16. The system of claim 15, wherein:

the second off-premise computer system is further configured to:

receive a response message from the on-premise computer system; and transmit the response message to a response queue of the messaging service, the response queue being associated with an external computer system from which the request was received; and the messaging service is further configured to push the response message to the first off-premise computer system.

17. The system of claim 15, wherein the first off-premise computer system is further configured to:

create a message subscriber for the first off-premise computer system that is subscribed to a response queue associated with an external computer system from which the request was received.

18. A method for communicating using a hybrid cloud computing system that includes at least one on-premise computer system and at least one off-premise computer system, the method comprising:

receiving a request at a first off-premise computer system of the hybrid cloud computing system;

identifying an on-premise computer system of the hybrid cloud computing system to process the request;

transmitting a message constructed based on the request to a request queue associated with the on-premise computer system;
pushing the message to a second off-premise computer system of the hybrid cloud computing system that has an open connection to the on-premise computer system;
transmitting the message to the on-premise computer system;
establishing a connection from the on-premise computer system to the first off-premise computer system; and
responsive to establishing the connection, creating a message subscriber for the first off-premise computer system that is subscribed to a request queue associated with the on-premise computer system,
wherein the on-premise computer system is configured to not accept incoming connections, and
wherein the first off-premise computer system and the second off-premise computer system are either the same or different off-premise computer systems.

19. The method of claim 18, further comprising:
responsive to establishing the connection, transmitting an authorization token from the on-premise computer system to the first off-premise computer system, the authorization token securely identifying the on-premise computer system to the first off-premise computer system.

20. A method for communicating using a hybrid cloud computing system that includes at least one on-premise computer system and at least one off-premise computer system, the method comprising:
receiving a request at a first off-premise computer system of the hybrid cloud computing system;
identifying an on-premise computer system of the hybrid cloud computing system to process the request;
transmitting a message constructed based on the request to a request queue associated with the on-premise computer system;
pushing the message to a second off-premise computer system of the hybrid cloud computing system that has an open connection to the on-premise computer system;
transmitting the message to the on-premise computer system; and
creating a message subscriber for the first off-premise computer system that is subscribed to a response queue associated with an external computer system from which the request was received,
wherein the on-premise computer system is configured to not accept incoming connections, and
wherein the first off-premise computer system and the second off-premise computer system are either the same or different off-premise computer systems.

21. A method for communicating using a hybrid cloud computing system that includes at least one on-premise computer system and at least one off-premise computer system, the method comprising:
receiving a request at a first off-premise computer system of the hybrid cloud computing system;
identifying an on-premise computer system of the hybrid cloud computing system to process the request;
transmitting a message constructed based on the request to a request queue associated with the on-premise computer system, wherein the message includes an authorization token, the authorization token being associated with a user that initiated the request, the authorization token securely identifying the user to the on-premise computer system;
pushing the message to a second off-premise computer system of the hybrid cloud computing system that has an open connection to the on-premise computer system;
signing the message to generate a message signature by the second off-premise computer system to securely identify the second off-premise computer system as originator of the message;
transmitting the message to the on-premise computer system; and
prior to processing the message by the on-premise computer system, validating the message signature by the on-premise computer system,
wherein the on-premise computer system is configured to not accept incoming connections, and
wherein the first off-premise computer system and the second off-premise computer system are either the same or different off-premise computer systems.

* * * * *